US009646100B2

(12) United States Patent
Shyamsunder et al.

(10) Patent No.: US 9,646,100 B2
(45) Date of Patent: May 9, 2017

(54) METHODS AND SYSTEMS FOR PROVIDING CONTENT PROVIDER-SPECIFIED URL KEYWORD NAVIGATION

(75) Inventors: Karthik Shyamsunder, Winchester, VA (US); Daniel Schonfeld, Reston, VA (US)

(73) Assignee: VERISIGN, INC., Reston, VA (US)

( * ) Notice: Subject to any disclaimer, the term of this patent is extended or adjusted under 35 U.S.C. 154(b) by 208 days.

(21) Appl. No.: 13/250,864

(22) Filed: Sep. 30, 2011

(65) Prior Publication Data

US 2012/0239731 A1  Sep. 20, 2012

Related U.S. Application Data

(60) Provisional application No. 61/452,516, filed on Mar. 14, 2011.

(51) Int. Cl.
*G06F 17/30* (2006.01)
*H04L 29/12* (2006.01)
*G06F 9/44* (2006.01)

(52) U.S. Cl.
CPC .. *G06F 17/30876* (2013.01); *G06F 17/30867* (2013.01); *G06F 17/30899* (2013.01); *G06F 9/4443* (2013.01); *H04L 29/12594* (2013.01)

(58) Field of Classification Search
CPC .......................... G06F 17/3089; G06Q 30/02
USPC ............... 709/203, 217, 219, 223, 224, 226
See application file for complete search history.

(56) References Cited

U.S. PATENT DOCUMENTS

| 6,115,754 A | 9/2000 | Landgren |
| 6,654,741 B1 | 11/2003 | Cohen et al. |
| 6,901,436 B1 | 5/2005 | Schneider |
| 6,957,224 B1 | 10/2005 | Megiddo et al. |

(Continued)

FOREIGN PATENT DOCUMENTS

| CN | 1327195 A | 12/2001 |
| JP | H11-328079 A | 11/1999 |

(Continued)

OTHER PUBLICATIONS

International Search Report issued in PCT/US2012/028848 on Jun. 21, 2012 (15 pages total).

(Continued)

*Primary Examiner* — Barbara Burgess
(74) *Attorney, Agent, or Firm* — MH2 Technology Law Group, LLP

(57) ABSTRACT

An apparatus and a non-transitory computer-readable medium may perform a method for providing content provider-specified URL keyword navigation. The method may comprise: receiving a first HTTP response from a first web server, wherein the first HTTP response includes a client-executable program; executing the client-executable program, wherein executing the client-executable program comprises: identifying a keyword included in a first URL; transmitting at least a portion of the first URL and the keyword to a second server for resolution; and receiving a second URL corresponding to a resolution of the keyword from the second server; sending a second HTTP request to a third web server for a second resource defined by the second URL; and receiving a second HTTP response from the third web server, wherein the second HTTP response includes the third resource.

9 Claims, 11 Drawing Sheets

(56) References Cited

U.S. PATENT DOCUMENTS

| | | | |
|---|---|---|---|
| 7,130,877 B2 | 10/2006 | McNeely et al. | |
| 7,315,902 B2 | 1/2008 | Kirkland | |
| 7,634,532 B2 | 12/2009 | Kawamura et al. | |
| 7,894,986 B2 | 2/2011 | Hegedue et al. | |
| 7,908,317 B2 | 3/2011 | Musson | |
| 7,921,097 B1 | 4/2011 | Dandekar et al. | |
| 8,001,013 B2 | 8/2011 | Serbanescu | |
| 8,060,601 B1* | 11/2011 | Brown | G06F 9/4443 709/224 |
| 8,082,491 B1 | 12/2011 | Abedelaziz et al. | |
| 8,224,994 B1 | 7/2012 | Schneider | |
| 8,381,276 B2 | 2/2013 | Costinsky | |
| 8,463,877 B1 | 6/2013 | Richardson et al. | |
| 8,510,348 B2 | 8/2013 | Hancock | |
| 8,630,200 B2 | 1/2014 | St. Jean et al. | |
| 2002/0193986 A1 | 12/2002 | Schirris | |
| 2003/0208472 A1 | 11/2003 | Pham | |
| 2004/0039798 A1 | 2/2004 | Hotz et al. | |
| 2005/0071834 A1 | 3/2005 | Gates et al. | |
| 2006/0101005 A1 | 5/2006 | Yang et al. | |
| 2007/0094727 A1 | 4/2007 | Singh | |
| 2007/0100795 A1 | 5/2007 | Davies | |
| 2007/0180147 A1* | 8/2007 | Leigh | G06Q 30/02 709/246 |
| 2007/0273518 A1 | 11/2007 | Lupoli et al. | |
| 2008/0005194 A1 | 1/2008 | Smolen et al. | |
| 2008/0086555 A1 | 4/2008 | Feinleib | |
| 2008/0201413 A1 | 8/2008 | Sullivan et al. | |
| 2008/0228719 A1 | 9/2008 | Abhyanker et al. | |
| 2008/0228720 A1 | 9/2008 | Mukherjee et al. | |
| 2008/0306913 A1* | 12/2008 | Newman | G06F 17/30867 |
| 2009/0228557 A1 | 9/2009 | Ganz et al. | |
| 2009/0254427 A1 | 10/2009 | Garrison | |
| 2010/0031369 A1* | 2/2010 | Grummt | H04L 29/12594 726/27 |
| 2010/0036797 A1 | 2/2010 | Wong et al. | |
| 2010/0077323 A1 | 3/2010 | Hunter | |
| 2010/0097634 A1 | 4/2010 | Meyers et al. | |
| 2010/0198837 A1 | 8/2010 | Wu et al. | |
| 2010/0287191 A1 | 11/2010 | Price et al. | |
| 2010/0325101 A1 | 12/2010 | Beal et al. | |
| 2011/0055314 A1* | 3/2011 | Rosenstein | G06F 17/30899 709/203 |
| 2011/0078553 A1 | 3/2011 | Reimann et al. | |
| 2011/0113112 A1 | 5/2011 | Ganz et al. | |
| 2011/0119243 A1 | 5/2011 | Diamond et al. | |
| 2011/0137789 A1 | 6/2011 | Kortina et al. | |
| 2011/0179154 A1 | 7/2011 | Ravichandran et al. | |
| 2011/0238584 A1 | 9/2011 | Ikavalko et al. | |
| 2011/0258204 A1 | 10/2011 | Hubbard et al. | |
| 2011/0307432 A1 | 12/2011 | Yao et al. | |
| 2012/0079368 A1 | 3/2012 | Abdelaziz et al. | |
| 2012/0173565 A1 | 7/2012 | Jacobs et al. | |
| 2012/0173692 A1 | 7/2012 | Lakes et al. | |
| 2012/0204224 A1 | 8/2012 | Wang et al. | |
| 2012/0278467 A1 | 11/2012 | Schneider | |
| 2012/0323912 A1 | 12/2012 | Stephens, Jr. | |
| 2013/0067115 A1 | 3/2013 | Lapanc | |
| 2014/0040312 A1 | 2/2014 | Gorman et al. | |
| 2014/0136572 A1 | 5/2014 | Miller et al. | |
| 2014/0143337 A1 | 5/2014 | McIntosh et al. | |
| 2014/0156702 A1 | 6/2014 | Shyamsunder et al. | |
| 2014/0181256 A1 | 6/2014 | Trifa et al. | |
| 2014/0245193 A1 | 8/2014 | Brindley | |
| 2015/0296230 A1 | 10/2015 | Barton | |

FOREIGN PATENT DOCUMENTS

| | | |
|---|---|---|
| WO | WO 98/03923 | 1/1998 |
| WO | WO 2005/001628 | 1/2005 |
| WO | 2005/031613 A1 | 4/2005 |
| WO | 2010/002603 A1 | 1/2010 |

OTHER PUBLICATIONS

T.V. Raman: "Usage Patterns for Client-Side URI parameters," W3C Working Draft, (Apr. 15, 2009), pp. 1-7, Retrieved from the Internet (Jun. 12, 2012): URL:http://www.w3.org/TR/2009/WD-hash-in-uri-20090415.

Extended European Search Report dated Feb. 12, 2014 issued in European Application No. 13182268.6 filed Aug. 29, 2013, 5 pages.

Non-Final Office Action dated Jun. 2, 2014, U.S. Appl. No. 13/622,541, filed Sep. 19, 2012, pp. 1-36.

Non-Final Office Action dated Jun. 6, 2014, U.S. Appl. No. 14/176,723, filed Feb. 10, 2014, pp. 1-21.

Non-Final Office Action dated Jan. 23, 2015, U.S. Appl. No. 13/622,541, filed Sep. 19, 2012, pp. 1-26.

Final Office Action dated Aug. 12, 2015, U.S. Appl. No. 13/622,541, pp. 1-28.

Non-Final Office Action dated Sep. 14, 2015, U.S. Appl. No. 14/176,723, pp. 1-17.

Demetris Antoniades et al., "we.b: The web of short URLs", Proceedings of the 20th International Conference on World Wide Web. ACM, Mar. 28-Apr. 1, 2011, pp. 715-724.

Non-Final Office Action dated Sep. 14, 2015, U.S. Appl. No. 14/611,707, pp. 1-19.

International Search Report and Written Opinion of the International Searching Authority dated Nov. 30, 2015, International Application No. PCT/US2015/046705, pp. 1-9.

Extended European Search Report dated Dec. 22, 2015, European Application No. 15182432.3, pp. 1-6.

Cristina Dumitrescu (Examiner), Extended European Search Report dated Aug. 5, 2016, European Application No. 14783257.0, pp. 1-8.

Anonymous, "Semantic URL—Wikipedia, the free encyclopedia", Jan. 29, 2015, Retrieved from the internet on Jun. 2, 2016: http://web.archive.org/web/20150129082609/http://en.wikipedia.org/wiki/Semantic_URL, pp. 1-3.

Anonymous, "URL redirection—Wikipedia, the free encyclopedia", Jan. 17, 2015, Retrieved from the internet on Jun. 2, 2016: http://web.archive.org/web/20150117115508/http://en.wikipedia.org/wiki/URL_redirection, pp. 1-10.

Azzurra Chinzer (Examiner), Extended European Search Report dated Jun. 23, 2016, European Application No. 16153508.0, pp. 1-12.

Barbara N. Burgess (Examiner), Final Office Action dated May 5, 2016, U.S Appl. No. 14/176,723, pp. 1-30.

Barbara N. Burgess (Examiner) Final Office Action dated May 6, 2016, U.S. Appl. No. 14/611,707, pp. 1-28.

Kiaofang Zhang (Examiner), First Chinese Office Action dated Apr. 1, 2016, Chinese Application No. 201280014226.6, pp. 1-32.

Second Office Action dated Jan. 16, 2017, Chinese Patent Application No. 201280014226.6, pp. 1-7.

Barbara N. Burgess (Examiner), Non-Final Office Action dated Jan. 26, 2017, U.S. Appl. No. 14/611,707, pp. 1-18.

Barbara N. Burgess (Examiner), Final Office Action dated Feb. 24, 2017, U.S. Appl. No. 14/176,723, pp. 1-17.

* cited by examiner

510 ⸺ http://www.newnews.com/#earthquake 510a, 510b

520 ⸺ www.acmecorp.cc#anvil

530 ⸺ momandpopshop.com#green light special

540 ⸺ www.vanderbilt.edu/students/undergraduate/#(admission*|entrance)

550 ⸺ site.netops.globalsecuritiestrade.org/stocks.pl?lang=fr&mobile=yes#ETFs

560 ⸺ https://www.electronicsgalore.com/#iMop#iVacuum#iToilet 560a, 560b, 560c

Figure 5

600 {
610 ⸺ GET / HTTP/1.1
Accept: image/gif, image/x-xbitmap, image/jpeg, image/pjpeg, application/x-shockwave-flash, application/xaml+xml, application/vnd.ms-xpsdocument, application/x-ms-xbap, application/x-ms-application, application/vnd.ms-excel, application/vnd.ms-powerpoint, application/msword, */*
Accept-Language: en-us
UA-CPU: x86
Accept-Encoding: gzip, deflate
User-Agent: Mozilla/4.0 (compatible; MSIE 7.0; Windows NT 5.1; .NET CLR 2.0.50727; .NET CLR 3.0.04506.30; .NET CLR 1.1.4322; .NET CLR 3.0.4506.2152; .NET CLR 3.5.30729; .NET4.0C; .NET4.0E)
Host: www.newnews.com ⸺ 620
Connection: Keep-Alive

710 {
```
HTTP/1.1 200 OK
Date: Sun, 13 Mar 2011 20:52:58 GMT
Server: Apache
Set-Cookie: user_id=06242010
Accept-Ranges: bytes
Cache-Control: max-age=60, private, private
Expires: Sun, 13 Mar 2011 20:53:54 GMT
Content-Type: text/html
Vary: User-Agent,Accept-Encoding
Content-Length: 24359
Keep-Alive: timeout=2, max=10
Connection: Keep-Alive
```

720 {

```
<!DOCTYPE HTML PUBLIC "-//W3C//DTD HTML 4.01 Transitional//
EN""http://www.w3.org/TR/html4/loose.dtd"><html lang="en">
<head>
    <title>NewNews.com - All the News That's Fit To Be Tied</title>
    <meta http-equiv="refresh" content="1800;url=?refresh=1">
```

721 {

721a { 
```
    <script src="http://www.resolvecom.com/scripts/keyworddetector.js"
        type="text/javascript"></script>
```

721b {
```
    <script >
        keywordRedirect();
        function keywordRedirect() {
            . . .
        }
    </script>
</head>
```

722 {
```
<body id="NewNewsMainPage">

<h2>Welcome to NewNews.com</h2>
<p>Your source for the most cutting edge and up to date news</p>
<div id="breaking_news">
<ul>
    <li><a href="/world/freedonia/events.rb?article_id=07021974">8.9
Magnitude Earthquake Rocks Freedonia</a>
    <li><a href="/local/US_IN_Granger/
events.rb?article_id=02131980">Village Idiot Wins Lottery, Loses Ticket</a>
</ul>
. . .
</body>
</html>
```

Figure 7

800 ~ http://www.resolvecom.com/resolver.php?URL=newnews.com&keyword=earthquake

- 810: http://www.resolvecom.com/
- 820: resolver.php?
- 830: URL=newnews.com&keyword=earthquake
  - 830a: URL=newnews.com
  - 830b: &keyword=earthquake

Figure 8

900 ~ http://www.newnews.com/2011/WORLD/asiapcf/03/13/freedonia.quake/index.html

Figure 9

METHODS AND SYSTEMS FOR PROVIDING CONTENT PROVIDER-SPECIFIED URL KEYWORD NAVIGATION

This application claims priority to U.S. Provisional Patent Application No. 61/452,516, filed Mar. 14, 2011, which is incorporated herein by reference in its entirety.

TECHNICAL FIELD

The present disclosure relates generally to methods and systems for providing webpages in response to keywords embedded in uniform resource locators requested by clients.

BACKGROUND

Currently, end users have essentially two options for locating content relevant to a particular topic. Users may search for webpages relevant to a topic by entering keywords associated with the topic into a search engine and reviewing the search engine's results. However, because search engines typically index, and thus search, many millions of different webpages, users may have to review many search results in order to find webpages relevant to the topic they are searching for. For example, the information a user seeks may be located near the end of a long result list, and the user may give up before reaching it. Moreover, search engines typically determine webpages that are relevant to keywords through machine algorithms based primarily on textual analysis and rankings of pages based on the number of links to such pages from other webpages, rather than by human judgment.

Alternatively, if a user wishes to locate a webpage relevant to a given topic within a particular content provider's website—such as product or promotion being offered by an online retailer—the user may instead navigate directly to the content provider's website in order to search for relevant webpages. If the content provider's website provides search functionality, then the user may perform a search on the content provider's website for one or more keywords descriptive of the topic. However, often the user must still wade through search results in which webpages are listed based on machine algorithms, rather than a predetermined decision by the content provider as to which webpage should be definitively associated with a given topic. Or, if no such search functionality exists on the content provider's website, the user may need to simply explore the website through traditional web-navigation techniques, in which case the information sought may be buried under several menus or links, and thus may difficult for the user to find.

One solution to the above problem is the use of domain-specific, or in-site, keywords, as described in U.S. patent application Ser. No. 12/982,145, which is presently assigned to the same assignee as the current application, and constitutes a part of this application as though set forth within. Through the use of in-site keywords, a content provider, such as a domain name owner, may compile in advance a list of keywords mapped to specific webpages on the content provider's website. For example, a user may enter a search tem—e.g., "dynamite"—in a navigation or keyword box provided on the "acmecorp.cc" website. Acme Corp. may have created a keyword "dynamite" that maps the search tem "dynamite" directly to a webpage that provides a list of explosives-related items available for purchase—e.g., "http://acmecorp.cc/acme/products/road_runner_accessories/weaponry/explosives.aspx".

Thus, rather than presenting the user with a traditional list of search results for all webpages across the Acme Corp. website that contain the text "dynamite," the user may instead be taken directly to the "explosives.aspx" webpage in response to entering the search term "dynamite" in the navigation or keyword box. This technique has advantage that the content provider itself may determine which webpage is most relevant to a given topic, which web users may rely on when searching a website for a particular product or promotion. It also has the advantage that it is not dependent on machine algorithms or keyword similarities, as the "explosives.aspx" webpage may not even contain the text "dynamite," but instead may offer only TNT-related products. And, as further described in U.S. patent application Ser. No. 12/982,145, search terms entered into such a navigation or keyword box may, in some circumstances, be serviced by a third-party service provider or resolution server, thus obviating the need for special configuration on the content provider's web servers.

However, even using the above approach, in some circumstances, users may still need to first navigate to the homepage or other webpage within the content provider's website in order to locate an in-site keywords box, and would also need to be able to determine whether a given search box utilizes the above approach or merely provides traditional text-based searching functionality. Therefore, a need exists for methods and systems for enabling users to request webpages using content provider—or domain-specific keywords in a more direct manner that may easily be employed for any website that implements site-specific keywords and that will have no impact on navigation within websites to that do not implement site-specific keywords.

BRIEF SUMMARY

Consistent with an exemplary embodiment of the present invention, there is provided a non-transitory computer-readable medium encoded with instructions that, when executed on a processor, perform a method of retrieving a webpage associated with a domain-specific keyword, the method comprising: receiving an instruction to request a first resource defined by a first URL, wherein the first URL includes a keyword in the form of a fragment identifier; sending a first HTTP request to a first web server associated with a domain name specified by the first URL; receiving a first HTTP response from the first web server, wherein the first HTTP response includes a client-executable program; executing the client-executable program, wherein executing the client-executable program comprises: identifying the keyword; transmitting at least a portion of the first URL and the keyword to a second server for resolution; and receiving a second URL corresponding to a resolution of the keyword from the second server; sending a second HTTP request to a third web server for a second resource defined by the second URL; and receiving a second HTTP response from the third web server, wherein the second HTTP response includes a third resource.

Consistent with a further exemplary embodiment of the present invention, there is provided an apparatus for retrieving a webpage associated with a domain-specific keyword, comprising: a memory; and a processor communicatively coupled to the memory, the processor being configured to: receive an instruction from a client to request a first resource defined by a first URL, wherein the first URL includes a keyword in the form of a fragment identifier; send a first HTTP request to a first web server associated with a domain specified by the first URL; receive a first HTTP response from the first web server, wherein the first HTTP response includes a client-executable program; and execute the client-executable program, wherein executing the client-executable program comprises: determining a second URL associated with the first URL, the second URL being associated with a target page; and transmitting the second URL to the client.

Consistent with a further exemplary embodiment of the present invention, there is provided an apparatus for retrieving a webpage associated with a domain-specific keyword, comprising: a memory; and a processor communicatively coupled to the memory, the processor being configured to: receive an instruction to request a first resource defined by a direct navigation URL, the direct navigation URL including a keyword; send a first HTTP request to a first web server associated with a domain specified by the direct navigation URL, the first HTTP request including the keyword; and receive a first HTTP response from the first web server, wherein the first HTTP response includes a redirect instruction to a second resource defined by a second URL, the second URL being (1) determined by the first web server, (2) associated with the direct navigation URL by the first web server, and (3) based on the keyword.

Consistent with a further exemplary embodiment of the present invention, there is provided an apparatus for retrieving a webpage associated with a domain-specific keyword, the method comprising: a memory; and a processor communicatively coupled to the memory, the processor being configured to: receive an instruction to request a first resource defined by a first URL, wherein the first URL includes a keyword in the form of a fragment identifier; send a first HTTP request to a first web server associated with a domain name specified by the first URL; receive a first HTTP response from the first web server, wherein the first HTTP response includes a client-executable program; execute the client-executable program, wherein executing the client-executable program comprises: identifying the keyword; transmitting at least a portion of the first URL and the keyword to a second server for resolution; and receiving a second URL corresponding to a resolution of the keyword from the second server; send a second HTTP request to a third web server for a second resource defined by the second URL; and receive a second HTTP response from the third web server, wherein the second HTTP response includes a third resource.

Additional objects and advantages will be set forth in part in the description that follows, and in part will be obvious from the description, or may be learned by practice of the invention. The objects and advantages will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIG. 5 is list of exemplary URLs containing URL keywords, consistent with certain disclosed embodiments;

FIG. 6 is an exemplary HTTP request resulting from the enter of a URL containing a URL keyword, consistent with certain disclosed embodiments;

FIG. 7 is an exemplary HTTP response from keyword-enabled web server, consistent with certain disclosed embodiments;

FIG. 8 is an exemplary URL for requesting resolution of a URL keyword, consistent with certain disclosed embodiments;

FIG. 9 is an exemplary URL corresponding to a content provider-specified keyword-webpage mapping, consistent with certain disclosed embodiments;

DETAILED DESCRIPTION

Figure 1:
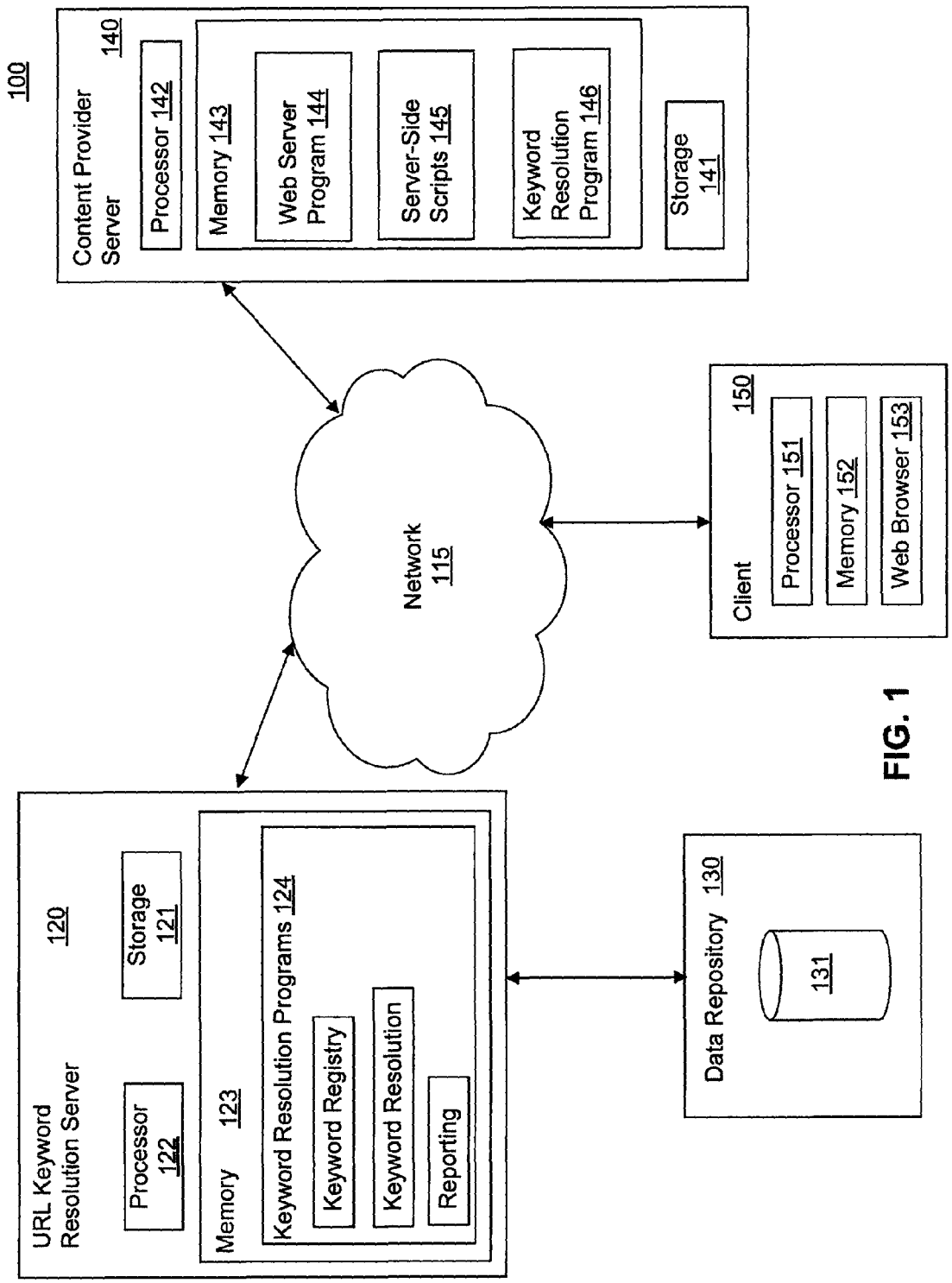
FIG. 1 is a diagram illustrating an exemplary keyword navigation system, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram illustrating an exemplary URL keyword resolution system 100 that may be used to implement disclosed embodiments, including exemplary system components. The components and arrangement, however, may be varied. URL keyword resolution server 120 may include a processor 122, a memory 123, input/output (I/O) devices (not shown), and storage 121. URL keyword resolution server 120 may be implemented in various ways. For example, URL keyword resolution server 120 may be a general purpose computer, a server, a mainframe computer, or any combination of these components. URL keyword resolution server 120 may communicate over a link with network 115. For example, the link may be a direct communication link, a LAN, a WAN, or other suitable connection. Network 115 may include the Internet. URL keyword resolution server 120 may be standalone or it may be part of a subsystem, which may, in turn, be part of a larger system, such as a legacy domain registration system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more keyword resolution programs or subprograms 124 loaded from storage 121 or elsewhere that, when executed by URL keyword resolution server 120, perform various procedures, operations, or processes consistent with disclosed embodiments. For example, memory 123 may include a keyword registry program that authenticates a domain name and allows a domain name controller to set up and maintain keywords for the domain name; a keyword resolution program that receives user requests to resolve one or more keywords within a domain, matches the keyword/domain name combination to a target URL, and provides the target URL to the user; a reporting program that displays statistics about keyword usage, resolution requests, and other metrics; and an integrative support program that links the other programs and allows them to use a common database, provides a common user interface, performs basic bookkeeping tasks, (such as storing the user's input, etc.), and provides user guidance and help. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a keyword resolution program 124 that performs several functions when executed by processor 122. For example, memory 123 may include a single program 124 that performs the functions of the keyword resolution system, or program 124 could comprise multiple programs. Moreover, processor 122 may execute one or more programs located remotely from URL keyword resolution server 120. For example, URL keyword resolution server 120 may access one or more remote programs that, when executed, perform functions related to disclosed embodiments.

Memory 123 may be also be configured with an operating system (not shown) that performs several functions well known in the art when executed by URL keyword resolution server 120. By way of example, the operating system may be Microsoft Windows™, Unix™, Linux™, Solaris™, an Apple Computers operating system, Personal Digital Assistant operating system such as Microsoft CE™, or some other operating system. The choice of operating system, and even to the use of an operating system, is not critical to any embodiment.

URL keyword resolution server 120 may include one or more I/O devices (not shown) that allow data to be received and/or transmitted by URL keyword resolution server 120. I/O devices may also include one or more digital and/or analog communication input/output devices that allow URL keyword resolution server 120 to communicate with other machines and devices, such as web server 140 or client computer 150. URL keyword resolution server 120 may receive data from external machines and devices and output data to external machines and devices via I/O devices. The configuration and number of input and/or output devices incorporated in I/O devices may vary as appropriate for certain embodiments.

URL keyword resolution server 120 may also be communicatively connected to one or more data repositories 130, e.g., through network 115. Data repository 130 may include one or more files or databases 131 that store information and are accessed and/or managed through URL keyword resolution server 120. By way of example, the databases may be Oracle™ databases, Sybase™ databases, or other relational databases, or non-relational databases, such as HBase or Cassandra. The databases or other files may include, for example, data and information related to domain names, keywords for domain names, descriptions, statistics, and other data related to keywords, etc. Systems and methods of disclosed embodiments, however, are not limited to separate databases.

URL keyword resolution server 120 may also be communicatively connected to one or more client computers 150 through network 115. Client computer 150 may include a processor 151, a memory 152, and a web browser 153 to communicate with URL keyword resolution server 120 and/or web server 140. Client computer 150 may also be communicatively connected to web server 140 through Network 115. In some embodiments, URL keyword resolution server 120 may send data to processor 151 and web browser 153, and web browser 153 may display the data as a keyword registration interface. In some embodiments, a client computer 150 may communicate with web server 140 using the HTTP protocol to retrieve and display webpages provided by web server 140. In some embodiments, a client computer 150 may transmit URL and keyword data to URL keyword resolution server 120 and may receive back target URL data corresponding to a URL designated by a content provider for particular domain/keyword pairs.

Web server 140 may be owned or operated by a content provider or domain name controller and may store web pages and other Internet resources associated with one or more domain names. Web server 140 may include a processor 142, a storage 141, and a memory 143. Storage 141 may be a volatile or non-volatile, magnetic, semiconductor, tape, optical, removable, nonremovable, or other type of storage device or computer-readable medium and may contain data used to display individual web pages. In disclosed embodiments, memory 143 may include one or more web server programs for receiving and responding to HTTP requests; one or more server-side scripts 145 for providing dynamic webpages; and one or more keyword resolution programs 146 for receiving and resolving requests for URL/keyword pairs. Each such program, for example, may be loaded from storage 141 or elsewhere.

Figure 2:
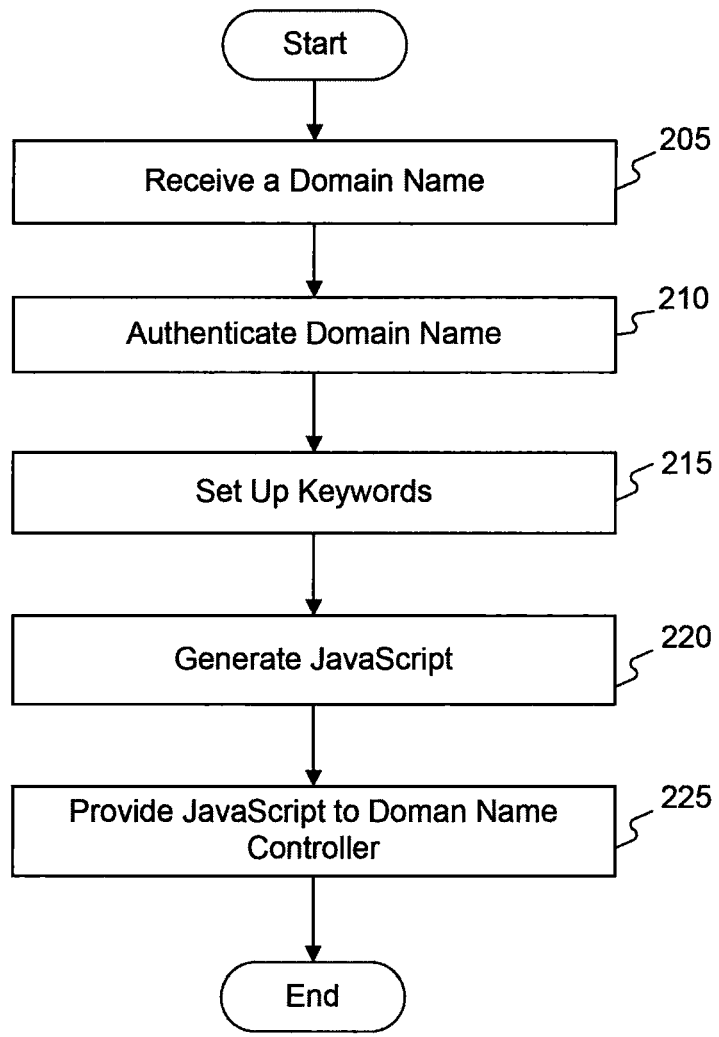
FIG. 2 is a flow diagram illustrating exemplary processes performed by a keyword management server, consistent with certain disclosed embodiments.

FIG. 2 is flow diagram illustrating exemplary processes performed by a keyword management server, consistent with disclosed embodiments. A keyword resolution service provider may provide the majority of technical infrastructure for enabling a content provider to implement URL keyword functionality consistent with the present invention. For example, the keyword resolution service provider may use a keyword management server to provide content providers with an interface, such as the interface depicted in FIG. 3, for registering and managing URL keywords.

In step 205, after a user acting on behalf of a content provider logs into the keyword management interface 300, the keyword management server receive a domain name (which may include path or query string information as well) from the user indicating a domain name for which the user wishes to register a keyword. A domain name identifies a realm of authority or control of Internet resources. Domain names are often hostnames that identify websites. For example, acmecorp.cc may be a domain name used by the Acme Corporation. Domain names are registered through domain name Registrars to signify an exclusive right to use the Internet resources associated with the domain name.

In step 210, for security purposes, the keyword management server may first require the user to authenticate the entered domain name by demonstrating that the user has authority to register keywords for it. For example, the keyword management server may create a meta tag for the user to insert into the home page of the domain. Such a meta tag may look like "<meta name="keyword-verification" content="djkaoieiosldisa"/>." The keyword management server may store the domain name and the value of the content field in a database or other file. After the meta tag has been inserted into the home page, the user may return to the authentication process. The keyword management server may then examine the home page of the domain in order to detect the presence of the meta tag. If the meta tag exists and has a content value matching the value stored by the keyword management server, then the user may be verified as having control over the domain name.

In alternate embodiments, a user may be requested to set up a CNAME record in the domain name system (DNS). A DNS record stores information used to resolve Internet address requests into a physical resource. A CNAME record specifies that a domain name is an alias of another domain. The keyword management server may, for example, instruct the domain name controller to add a CNAME Host of "djkaoieiosldisa" and a CNAME Text of "www.resolvecom.com" to the DNS. The keyword management server may store the CNAME Host with the domain name at a local database. After the CNAME record has been set up, the user may return to the authentication process. The keyword management server may then query the DNS of the domain to look for the CNAME Host and, if it is found and matches the stored CNAME Host, the user may be verified as the owner of the domain name.

Figure 3:
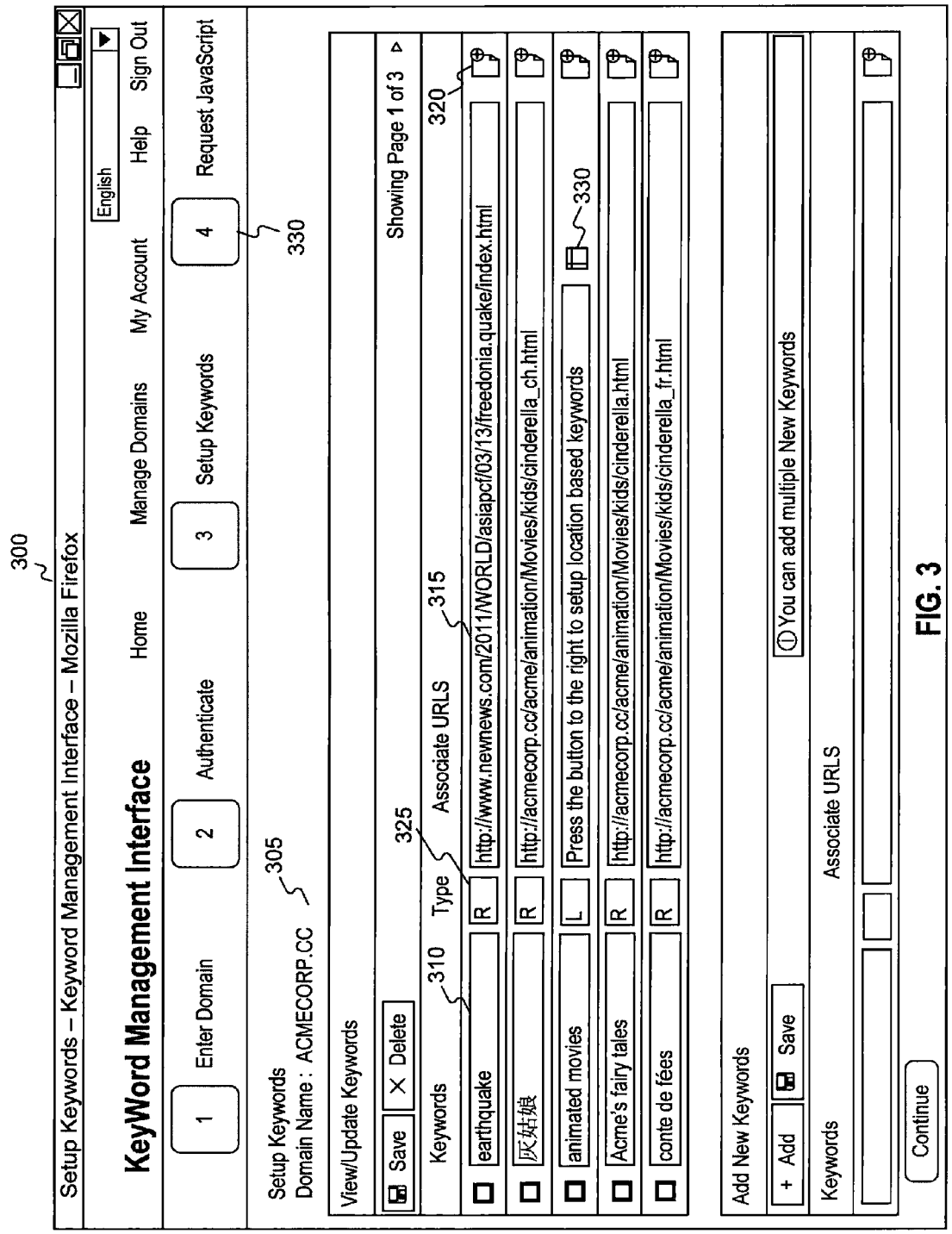
FIG. 3 is an exemplary interface provided by a keyword resolution server to enable a content provider to create, modify, and delete keyword-webpage mappings, consistent with certain disclosed embodiments.

For authenticated domain names, in Step 215, the keyword management server may allow a domain name controller to provide keywords for the domain. The keyword management server may provide an interface, such as the interface shown in FIG. 3, that allows a content provider or domain name controller to set up keywords. Keywords may be associated with a domain name, and the keyword management server may display the current domain name 305 in the interface. As shown in FIG. 3, the keyword management server may receive at least keyword 310 and URL 315 from the domain name controller, forming a keyword-URL pair. The URL identifies a specific web page that the domain name controller desires to associate with the keyword, such that a properly formatted to request to the domain name 305 that also includes the keyword 310 will automatically redirect the user to URL 315.

URL 315 may be a web page hosted at domain 305, but it need not be. URL 315 may be the address of any web page of any domain that the domain name controller chooses. After receiving the keyword and URL, the keyword management server may store the keyword-URL pair in a database or other file. The keyword-URL pair is associated with the current domain name 305.

In addition to this information, the keyword management server may also gather additional information, or metadata, related to a keyword through, for example, icon 320. This additional information may include, but is not limited to, a description of the URL or a description of the keyword. A URL description may be a business description of the URL that the domain name controller chooses. The description may also be used on keyword statistic reports and other reports generated by the keyword management server.

A keyword-URL pair may also be mapped to a location. A location may specify a zip code, a state, an area code, a country, a geo-location code, or some other geographic identifier. A domain name user may desire to have a different web page display for website visitors located in Hawaii than for website visitors located in Minnesota. A keyword resolution server may receive a geo-location code from a device supporting GPS or may use a source IP address of the website visitor to determine the location of the website visitor. The keyword resolution server may use this information to select a keyword-URL pair. The location allows a domain name controller to run regional advertising campaigns and direct website visitors to the appropriate regional offers.

A keyword may also have associated device metadata. The device may represent, for example, a personal digital assistant (PDA), a smart phone, a laptop, a tablet, etc. The device may enable the keyword resolution server to redirect a website visitor to the web page appropriate for the device type. For example, a domain may have one web page for mobile devices, such as a PDA or smart phone, and another web page for all other devices. The keyword resolution server may be configured to determine the type of device that initiated the search request and use the device type to choose an appropriate keyword-URL pair.

The keyword management server may use keyword type 325 of FIG. 3 to identify keywords with locations or devices. For example, a keyword with a type of "R" may not have any associated locations or devices. A keyword with a type of "L" may have locations associated with the keyword and a keyword with a type of "D" may have devices associated with the keyword.

In step 220, after the content provider or domain name controller has registered, modified, or deleted keyword mapping as necessary, the user may press button 330 to request that the keyword management server generate an appropriate client-executable program for embedding within content provider HTTP responses to enable user-provided URL keywords to be detected and resolved, as further described below. And, in step 225 the appropriate client-executable program, such as a JavaScript program, may be displayed for the user to copy and to place within the content provider's server logic.

Figure 4:
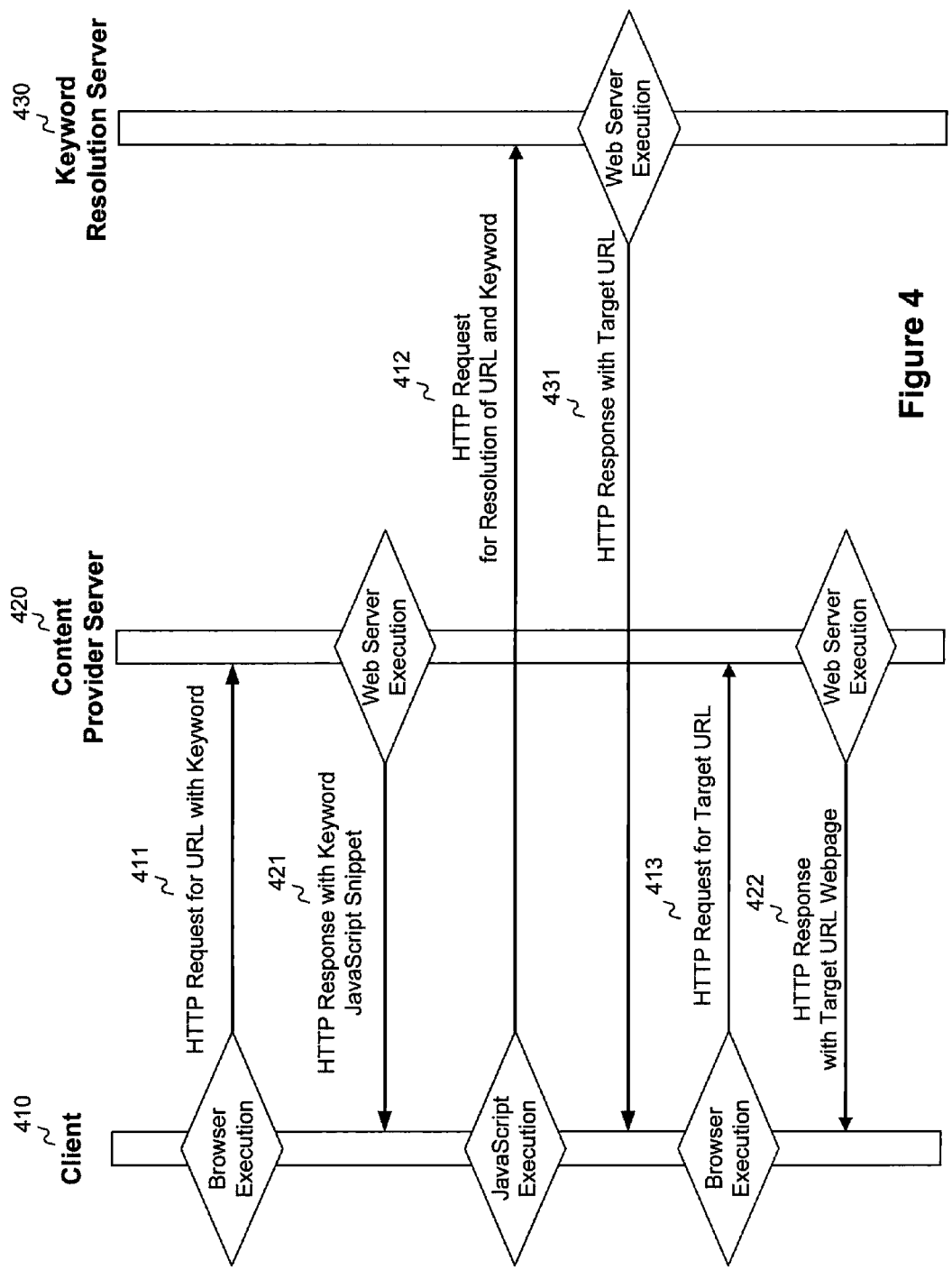
FIG. 4 is a flow diagram illustrating an exemplary method of resolving a user-supplied keyword to a content provider-specified webpage, consistent with certain disclosed embodiments.

FIG. 4 is a flow diagram depicting an exemplary method of directing a client to a webpage in response to a user-supplied URL keyword, consistent with certain disclosed embodiments. In the embodiment depicted in FIG. 4, a client 410, such as an end user, may send an HTTP request to a content provider server 420 for webpage associated with a URL (step 111).

For example, as depicted in FIG. 5, a user may type the URL 510 "http://www.newnews.com/#earthquake" into the address bar of a browser, which may cause the browser to make an HTTP GET request 600, as depicted in FIG. 6, to a web server 420 that hosts the "www.newnews.com" domain name. Specifically, in response to the user specifying URL 510, the HTTP request 600 from the user's browser may request the resource 610, which corresponds to the root "/" directory from the web server 420 that hosts the domain name 620 "www.newnews.com". Typically, web servers will be configured by to transmit a default HTML file, such as "index.html", in response to a request for the root directory.

URL 510 may comprise a resource string 510*a* and a keyword 510*b*, as indicated by the pound or hash symbol "#". This technique of demarcating URL keywords using hash symbols is similar, for purposes of syntax, to the use of fragment identifiers in URLs, which are defined by the Internet Engineering Task Force's RFC 3986 URL specification.

In conventional use, a fragment identifier may be used to identify a specific section within an HTML page received from a web server and to instruct the browser to navigate directly to that section when rendering the HTML page. For example, within the HTML text of a webpage, the author of the webpage may logically divide the content of the webpage into an "introduction" section, an "analysis" section, and a "conclusion" section. The author may further place the HTML anchor tags '<a href="#introduction">', '<a href="#analysis">', and '<a href="#conclusion">', before the content of the corresponding section. If a user requests a URL that includes the fragment identifier "#analysis" and there exists an HTML anchor tag for the "#analysis" fragment identifier, then the user's browser will not only download and render the HTML of the retrieved HTML document, but will also automatically scroll directly to the section of the HTML document that is preceded by the "#analysis" fragment identifier. Thus, conventionally fragment identifiers are processed entirely within the browser, as depicted in FIG. 6, are not included in the specified resource 610 of the browser's HTTP request 600 to the web server, and are processed after the content is retrieved via HTTP request 600. Furthermore, the conventional use of fragment identifiers does not generate additional HTTP requests and is only used to decide what portion of the content returned is displayed to the user when rendering is performed in the browser.

As further described below, however, the syntax of the fragment identifier may be used instead to indicate a URL keyword in accordance with the present invention. That is, the fragment identifier 510*b* "#earthquake" may not indicate that the user is specifying to the browser an initial scrolling focus on a section of the webpage anchored by the text "earthquake", but rather that the user is requesting that content provider server 420 respond by directing the user to whatever specific webpage the content provider has designated for the keyword "earthquake", which may be a webpage different from the webpage that was initially requested. In situations in which there is a conflict such as when the content provider is using the fragment identifier as both an anchor to an initial page and as a method to direct users to a specific webpage, the content provider and/or the keyword resolution service may determine whether or not to make the anchor or the keyword dominant. For example, the keyword resolution service may automatically honor the anchor if there is no conflict with a keyword, and if there is a conflict, the keyword may take precedence. Thus, the client would be directed to the specific webpage.

Continuing with this particular example, the user may have heard of a recent significant world event involving an earthquake in some foreign country. And, the user may further have desired to consult the website www.newnews.com for information about the event. However, rather than first going to the newnews.com homepage and either searching for articles discussing earthquakes, which might range from scientific explanations of earthquakes to historical summaries of earthquakes, or attempting to navigate through traditional navigation techniques, such as menus and subdirectories to find information on the recent earthquake (for which the user might not have enough information, such as the relevant country, to even know where to begin looking), the user may instead simply specify a base domain name 510*a* and a keyword 510*b* for the topic sought in a URL.

By causing a browser to make an HTTP request to this base domain name/keyword combination, the user is essentially requesting that a web server that hosts the www.newnews.com domain name provide the user with whatever specific webpage that the NewNews content provider has designated for that keyword. For example, once the NewNews content provider becomes aware of a major foreign earthquake, its editorial staff may create a webpage that details all of the pertinent information that it believes users would seek if looking for a webpage that provides a basic overview of the recent earthquake news event. Once that webpage is created and assigned a URL, such as URL 315 of FIG. 3, editorial, or other non-technical, content providers may log into the keyword system interface 300 to register the new keyword "earthquake" for the www.newnews.com domain name and to associate it with URL 315.

FIG. 5 depicts other potential forms of URLs in which keywords may be embedded consistent with embodiments of the present invention. For example, as in URL 520, which may be a preferred embodiment, a keyword (here, "anvil") may be embedded in any form of URL for which a browser may have sufficient information to make an HTTP request, and therefore the scheme or mechanism (here, "http") may not be present, and the root directory "/" symbol may also be omitted between the domain name and the keyword. In the example of URL 520, a user may append a keyword to the domain name of an online retailer (here, "acmecorp.cc") in order to request a content provider-designated webpage for a particular type of product for purchase (here, "anvil").

As shown in URL 530, a keyword may comprise non-allowed URL characters, such as spaces, which may undergo URI encoding prior to transmission in an HTTP response in order to use separate, space-delimited words or to include special characters, such as non-ASCII characters. In the example of URL 530, a user may append a keyword to the domain name of a local business (here "momandpopshop.com") in order to request a content provider-designated webpage for information about a particular promotion or event (here, "green light special") that is occurring at the local business.

As shown in URL 540, a keyword may also include wildcard, regular expression, or other characters to allow for flexible string matching of keywords; or may include alternative keywords, for example, in which alternatives are separated by a pipe "|" character. URL 540 also demonstrates that a keyword need not follow a domain name directly, but may instead be placed within a directory structure or other path within the URL. A keyword placed within a path may be handled in a variety of ways. For example, the keyword may be given preference over any path information such that any path in the URL is simply ignored if a keyword is found.

Alternatively, any path that precedes a keyword may limit the scope or otherwise provide a relevant namespace for that keyword. For example, a content provider may designate a first webpage for the keyword "admission" if it is placed within the "/students/undergraduate/" path in a URL (e.g., providing admissions information for undergraduate students) and a second webpage for the keyword "admission" if it is placed within the "/students/graduate/" path in a URL (e.g., providing admission information for graduate students). Similar techniques may be employed for content providers that offer "vanity" URLs within a single domain name to various different companies or organizations. For example, in the case of Facebook.com, which offers vanity URLs, such as "www.facebook.com/cocacola" or "www.facebook.com/toyota", the same keyword (e.g., "#2011challenge") may be linked to different webpages depending on whether it occurs within the "/cocacola" path or the "/toyota" path.

In the example of URL 540, a user may append a keyword to the domain name of a university (here, "www.vanderbilt.edu") or other non-profit organization (and further within a path following the domain name) to request a content provider-designated webpage for general information (e.g., a table of contents) about a particular subject (here, "admissions").

As shown in URL 550, a keyword may also be embedded within or appended to a query string within a URL. Similar to URL 540, the query string within URL 550 may be either ignored once a keyword is detected or may provide a namespace within which the keyword has a separate or distinct meaning. In some embodiments, a URL query string may simply provide additional parameters to be applied to any webpage returned in response to a user-specified keyword, such as an instruction that such a webpage should be provided in a particular language (here, "fr" for French) or in a particular format (here, formatted for a display on a mobile device). In the example of URL 550, a user may append a keyword to the domain name of an online information service provider (here, "site.netops.globalsecuritiestrade.org") to request a content provider-designated webpage that provides status or real-time information about a particular topic (here, "ETFs").

As shown in URL 550, a keyword may be appended to a domain name that includes multiple sub-domain names. And, similar to the path of URL 540, the specificity of the preceding domain name may define a namespace within which the keyword has a separate or distinct meaning. For example, a content provider may designate a first webpage for the keyword "ETFs" if it follows the more generic second-level domain name "globalsecuritiestrade.org" (e.g., providing information about ETF products in general) and a second webpage for the keyword "ETFs" if it follows the more specific sub-domain "netops.globalsecuritiestrade.org" or any other sub-domain within that sub-domain (e.g., providing real-time trading prices for various exchange traded funds). While FIG. 5 shows URLs including top-level domains, second-level domains, third-level domains, and fourth-level domains with the fragment identifier and keyword following the top-level domain, embodiments consistent with the present invention may implement the fragment identifier and keyword at any domain level within the URL and/or implement the fragment identifier in URLs including one or more of any domain level.

And, as shown in URL 560, multiple keywords 560*a*, 560*b*, and 560*c* may be placed in a URL. In the example of URL 560, a user may append multiple keywords to the domain name of an online retailer to request one or more content provider-designated webpages for particular product names. Various techniques could be employed for processing multiple keywords, including processing each keyword to determine whether a match exists and providing a webpage in response to the first keyword that has a designated webpage; assigning priority orderings for various keywords and providing the webpage designated for the highest ranked keyword in the URL; or providing specific webpage mappings for distinct keyword combinations (e.g., a first webpage for keyword 560*a*, a second webpage for keyword 560*b*, a third webpage for keyword 560*c*, and a fourth webpage for the combination of keywords 560*a*, 560*b*, and 560*c*).

Other techniques or syntax may be used to identify URL keywords. For example, a URL keyword may alternatively be identified by one or more characters, such as "$", "|", or "@", that are not valid URL characters unless converted to hexadecimal format. However, since such characters may also be used to define file names or valid paths within a URL, in some embodiments it may be preferable to use the hash symbol instead, since most web browsers are configured to omit any fragment identifiers (identified by the hash symbol) from an HTTP request, and thus there may be no danger that a web server that did not provide functionality for domain-specific keywords would attempt to locate a file that actually contained the keyword text in its file name.

A URL keyword of the present invention may also include international or special characters that are otherwise disallowed for URLs, since any such characters may simply be converted to hexadecimal form by the user's browser prior to transmission in an HTTP request. For example, a content provider, such as a bookseller that desires to create a keyword webpage for books directed to résumé drafting may create a keyword that uses the appropriate international characters, knowing that users may similarly specify the keyword "#résumé", which may be subjected to URI encoding to become "#r%C3%A9sum %C3%A9" by users' browsers when HTTP requests are made.

Returning to FIG. 4, in step 421, content provider server 420 receives HTTP request 610 and responds by transmitting an HTTP response 700, as depicted in FIG. 7. HTTP response 700 includes both header information 710 and payload data 720. Because keyword 510*b* may not be included in HTTP request 600 to content provider server 420 (since, when formatted as a fragment identifier, it may be omitted by the client's browser), at this point, content provider server 420 may not know whether the request for "www.newnews.com/" is meant as an actual request for a the root webpage at www.newnews.com or was merely used to specify the domain name for a domain-specific keyword. Therefore, content provider server 420 may transmit a payload 720 that includes the HTML text for the "index.html" file on the server.

However, in order to allow for the possibility that client 410 may be requesting a domain-specific keyword, content provider server 420 may also include a small amount of client-executable code within the HTML document/payload 720, such as, for example, "<head>" section 721. While in this exemplary embodiment the client-executable code is included within the "<head>" section, the client-executable code may be included anywhere in the HTML document. The client-executable code may comprise a JavaScript® or other client-executable program 721*b* the contents of which are provided directly by content provider server 420. Alternatively, content provider server 420 may include only a link 721*a* to a program file that resides on another server, such as keyword resolution server 430. Using this approach, client 410 may make a separate HTTP request to keyword resolution server 430 for the program file specified by link 721*a*, and, once the program file is received, may execute the program file within the client's browser program.

In step 412, client 410 may execute the client-executable program, for example, under a browser rule that any scripts contained within the "<head>" section 721 are to be executed prior to parsing or rendering any content in the "<body>" 722 section of the HTML document 720. The client-executable program may identify any URL keywords that the user included in the requested URL. For example, if keywords are formatted as fragment identifiers, because the client-executable program is executed within client 410, as opposed to on the content provider server 420, the client-executable program may have access to such fragment identifiers. In the example of URL 510, the client-executable program would identify the "#earthquake" fragment identifier as a domain-specific keyword.

In step 412, in response to identifying the presence of one or more domain-specific keywords, the client-executable program may cause client 410 to make a separate HTTP request to a separate keyword resolution server 430 to request the URL for the specific content provider-designated webpage for the keyword or keywords. For example, as depicted in FIG. 8, in the case of URL 510, client 410 may make an HTTP GET request to keyword resolution server 430 using URL 800. URL 800 may include the domain name 810 of the keyword resolution server; the path 820 of a server-side script on keyword resolution server 430 capable of performing keyword-lookup operations; and a query string 830 that specifies both the original URL 830*a* and the domain-specific keyword 830*b* requested by client 410.

For example, the client-executable program may make a synchronous or an asynchronous HTTP request to the keyword resolution server 430 using Asynchronous JavaScript and XML ("AJAX") or JQuery techniques known by those skilled in the art. The client-executable program may also make an HTTP request to the keyword resolution server using an HTML "<IFrame>" element or an HTML "<script>" element that has a target pointing to a URL hosted by the resolution server. Those skilled in the art will appreciate other means for providing the user-requested URL and domain-specific keyword to keyword resolution server 430 for resolution.

In 431, keyword resolution server 430 may determine which specific webpage, if any, on the content provider's website has been designated to be served for the requested keyword, and provide the target URL corresponding to that specific webpage back to the client. For example, in the case of URL 510, keyword resolution server 430 may provide client 410 with the URL 900, as depicted in FIG. 9, which is the same URL that the content provider had specified as URL 315 in the keyword specification interface 300. Content provider server 420 may provide URL 900 to client 410 as a simple text string in an AJAX response. Alternatively, keyword resolution server 430 may redirect client 410 to URL 900, for example using an HTTP 301 or 302 Redirect.

In step 413, client 410 may make a new HTTP request to content provider server 420 for the target URL provided by the keyword resolution server. For example, client 410 may make an HTTP request to content provider server 420 for the webpage associated with URL 900. And, in response, content provider server 420 may provide an HTTP response that includes the HTML text for the webpage specified by URL 900, thus providing client 410 with the webpage that the content provider has designated for the keyword "earthquake." The client may then render and display the webpage specified by URL 900 in the main browser window for the user to see and interact with.

The foregoing technique for providing content provider-designated webpages in response to user-specified keywords presents several additional benefits that merit brief treatment here. Clients may use existing browser programs request domain-specific keyword webpages without any need to modify or enhance the functionality of the browser programs, such as by browser plugin or add-on. Rather, to practice the present invention, browsers need only provide users with the ability to include fragment identifiers in URLs and include basic functionality for executing client-executable programs such as JavaScript®.

Content providers may likewise implement domain-specific keyword functionality in response to HTTP requests with only trivial modifications to existing server-side scripts or programs. Specifically, a content provider need only include a small amount of client-executable code within each webpage in a domain for which the content provider wishes to provide domain-specific keyword functionality. The content provider may then leave it to the client's browser and the relevant keyword resolution server to perform the actual keyword resolution operations. In fact, provided the content provider includes the requisite client-executable program in HTTP responses for webpages, the content provider's servers may remain completely agnostic as to whether a client has either requested a domain-specific keyword or is making a request for a specific webpage in response to a previous keyword resolution. Because the content provider server always returns any requested webpages along with the client-executable keyword resolution program, the content provider can ensure that clients that requested webpages in order to actually render them receive such webpages, whereas clients that request webpages merely as a means of specifying a domain namespace for a particular URL keyword are provided with the client-executable program necessary to resolve the keyword.

Similarly, by using the syntax of fragment identifiers to specify domain-specific keywords, users can make HTTP requests that include URL keywords to any content provider, whether or not that content provider is keyword-capable, without any danger of generating server response errors. Because browsers do not transmit fragment identifier text to web servers, the inclusion of a domain-specific URL keyword in an HTTP request to a web server that is not keyword-capable should not generate any errors, but should instead simply result in the webpage of the URL, without the fragment identifier, being downloaded and displayed. And, even for web servers that are keyword-capable, if the user specifies a domain-specific keyword for which the content provider has not designated a webpage, the keyword resolution server may simply provide an empty string in response to a resolution query, once again resulting in the webpage of the base URL being downloaded and displayed.

In the case where a keyword is found to correspond to a content provider-designated webpage, because the executable code for requesting a resolution of the keyword and redirecting the client to the resolved target URL is within the "<head>" section of the original HTML document returned by the content provider server, such code may be executed before any rendering of the original HTML document takes place. Thus, user should never see the originally requested HTML document displayed, even if only briefly, but it should appear to the user as though he or she went straight to the webpage associated with keyword.

Also, the use of a separate keyword resolution server, along with a keyword management interface 300, allows non-technical employees of a content provider to create, modify, or delete keyword-webpage mappings as business needs dictate without the need to involve technical employees such as IT personnel. Indeed, since the content provider itself can maintain the keywords without the need for any specific IT skills, costs can be reduced. Furthermore, content changes quickly and existing traditional navigation techniques would require an IT professional to reconfigure the web server.

In another embodiment, a content provider itself may perform the role of keyword resolution service provider. In particular, the client-executable program provided by the content provider server to the client may instruct the client, after identifying one or more URL keywords, to query the content provider itself, rather than a separate keyword resolution server, for the content provider-designated webpages corresponding to the identified keywords.

The present invention is not limited to circumstances in which a user manually types a domain-specific keyword into a URL. Rather, the domain-specific keyword may be included in a requested URL in any manner, such as being specified within a hyperlink in an existing HTML document, being included in navigation "bookmark", being provided by a web server, such as in the form of an HTTP Redirect, or being included within a native mobile phone application.

The present invention may also allow users to use wildcards or regular expressions in keywords, such as "engineer*", which may resolve to "engineer," "engineers," "engineering," "engineering schools," etc. In some embodiments, if there are a sufficient number of potential resolutions for a wildcard or regular expression keyword, the user may be prompted with a list of choices.

Those skilled in the art will also appreciate that although both the originally requested base URL of step 411 and target URL of step 413 may be hosted by the same content provider entity, the resources hosted by the respective URLs may be hosted by separate web servers. Also, although described predominantly in this application as "domain-specific" keywords, those skilled in the art that the concept may be expanded to provider-specific keywords. For example, a single content provider may own and host the distinct domain names "zulumail.tv" and "zmail.tv", both of which are directed to the same hosting service or are hosted by the same web servers. And, the content provider may designate a single webpage for the keyword "#forwarding", regardless of whether it is requested by a user as part of a URL based on either domain. That is, both "http://zulumail-.tv/#forwarding" and "http://zmail.tv/#forwarding" might resolve to the URL "HTTP://zmail.tv/user_options/mail-_handling/automatic_forwarding.htm".

Similarly, the concept may be expanded to allow a first content provider to designate another content provider's webpage for a given keyword. For example, if a number of smaller weather-related websites rely on a larger service provider to supply real-time weather information, the content provider responsible for each smaller website may designate a webpage hosted by the larger service provider for the keyword "#storms".

In other words, a content provider is not limited in any way to the specific webpage that it may designate for a given keyword. However, as described with respect to FIG. 2, a content provider may be limited in that it may not designate keywords for websites or domains that it does not either own or control or have authority over. And moreover, a given content provider-designated keyword may have a meaning only within a specific domain name, which also may include a URL path, a query string, and/or a port number.

Figure 10:
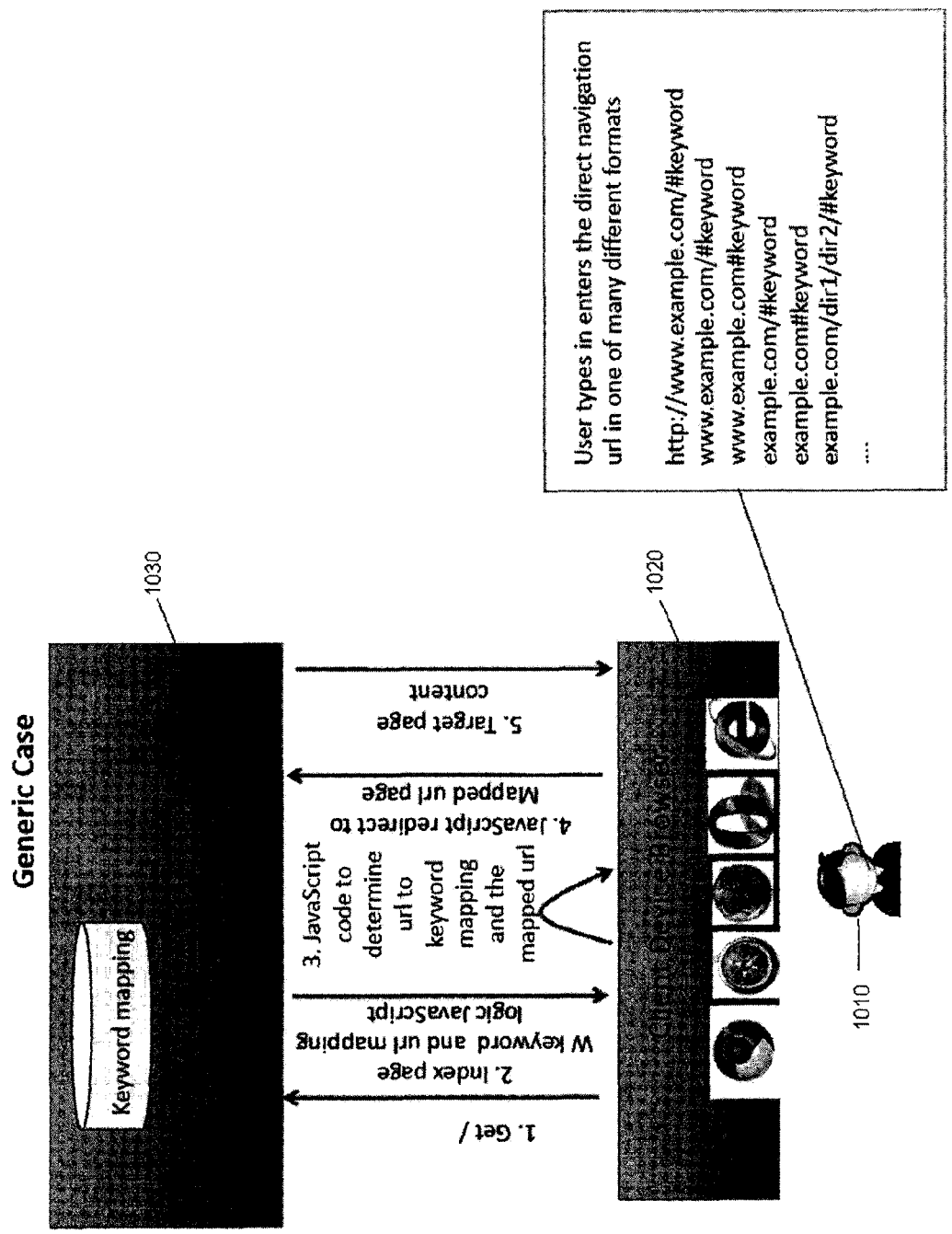
FIG. 10 is an exemplary implementation of an exemplary embodiment consistent with the present invention.

Furthermore, there are a number of implementation options for embodiments of keyword/URL mappings. As shown in FIG. 10, in the generic case, a user 1010 may input a direct navigation URL, such as "example.com#keyword," into a browser 1020, causing the browser 1020 to make an HTTP GET request to the example.com server 1030. In response to the user specifying the direct navigation URL, the GET request from the browser 1020 may request the resource that corresponds to the root "/" directory from the server 1030 that hosts the domain name "example.com." Generally, web servers transmit a default HTML file, such as "index.html," in response to a request for the root directory, along with the requisite keyword/URL mapping and keyword resolution program, such as, for example, a JavaScript code. Browser 1020 may then implement the keyword resolution program to determine the URL to keyword mapping and the mapped URL. The Browser 1020 may then transmit a request to the server 1030 for the mapped URL page, and in response to the request, the server may return the target page (i.e., the page associated with the keyword). Alternatively, the content provider server could request resolution, or instruct the client to request resolution, of the keyword from a separate server, such as a keyword resolution server.

Figure 11:
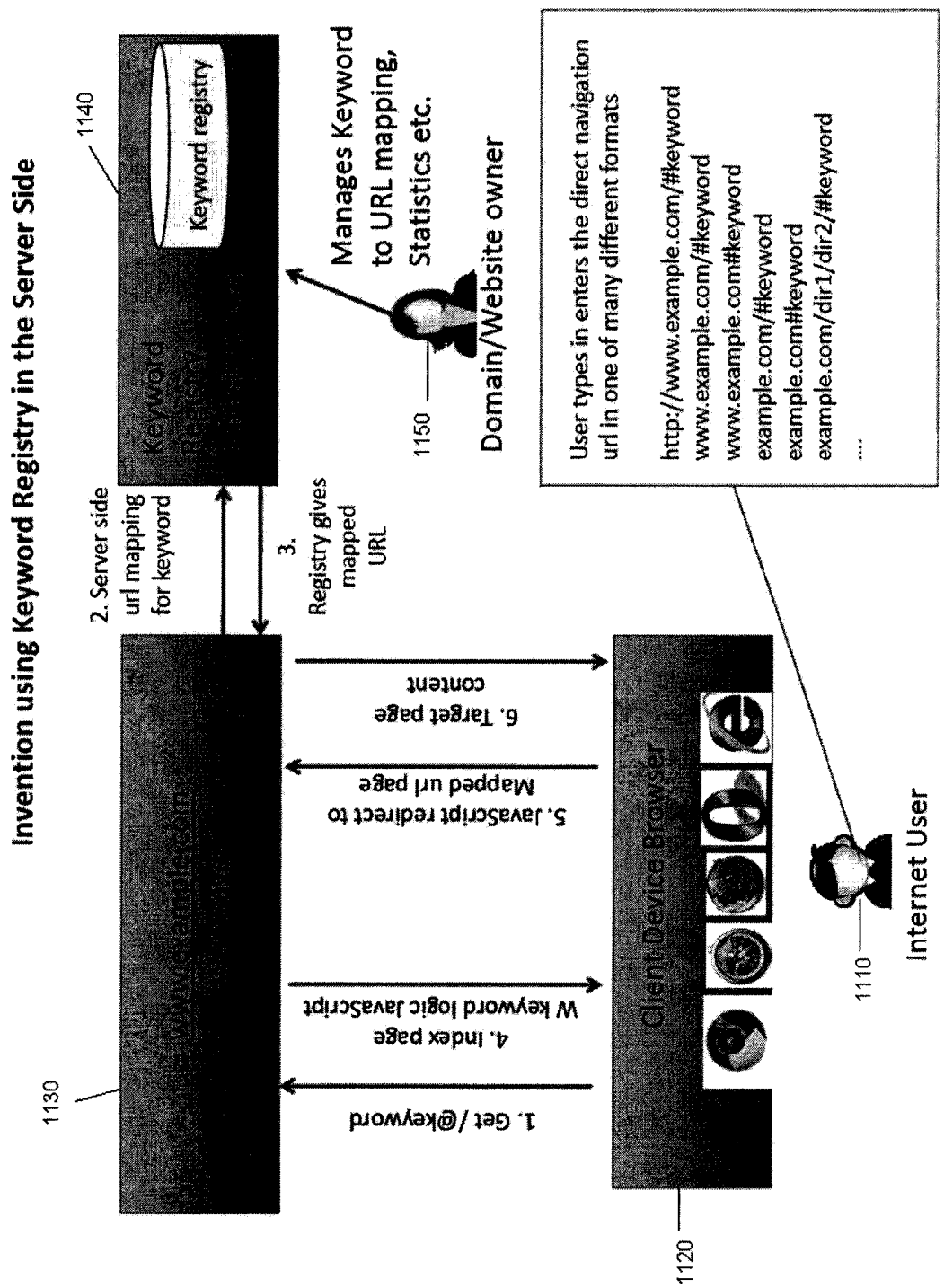
FIG. 11 is an exemplary implementation of keyword/URL mapping on the server side consistent with the present invention.

The keyword/URL mapping can be performed in a number of ways. For example, the keyword/URL mapping can be performed on the server side, be cloud-based, or performed on the client side. FIG. 11 is an exemplary implementation of keyword/URL mapping performed on the server side. As shown in FIG. 11, there may be an interne user 1110, a browser 1020, a server 1130, and a keyword registry 1140. They keyword registry 1140 may be configured by a domain owner 1150 in a way that the domain owner 1150 associates the keyword to a particular website in the domain, and may be a separate server or may be part of server 1130 itself.

As shown in FIG. 11, user 1110 may input a direct navigation URL, such as "example.com#keyword," into browser 1120. The browser 1120 may translate the "#" to some other character, such as "@" and make a request to the server side using the keyword and the new character. Server 1130 may then communicate with keyword registry 1140 to determine the URL mapped to the keyword, and the server 1130 may transmit a default HTML file, such as "index.html," in response to the request along with a keyword resolution program, such as, for example, a JavaScript code. Browser 1020 may then transmit a request to the server 1130 for the mapped URL page, and in response to the request, the server may return the target page.

Figure 12:
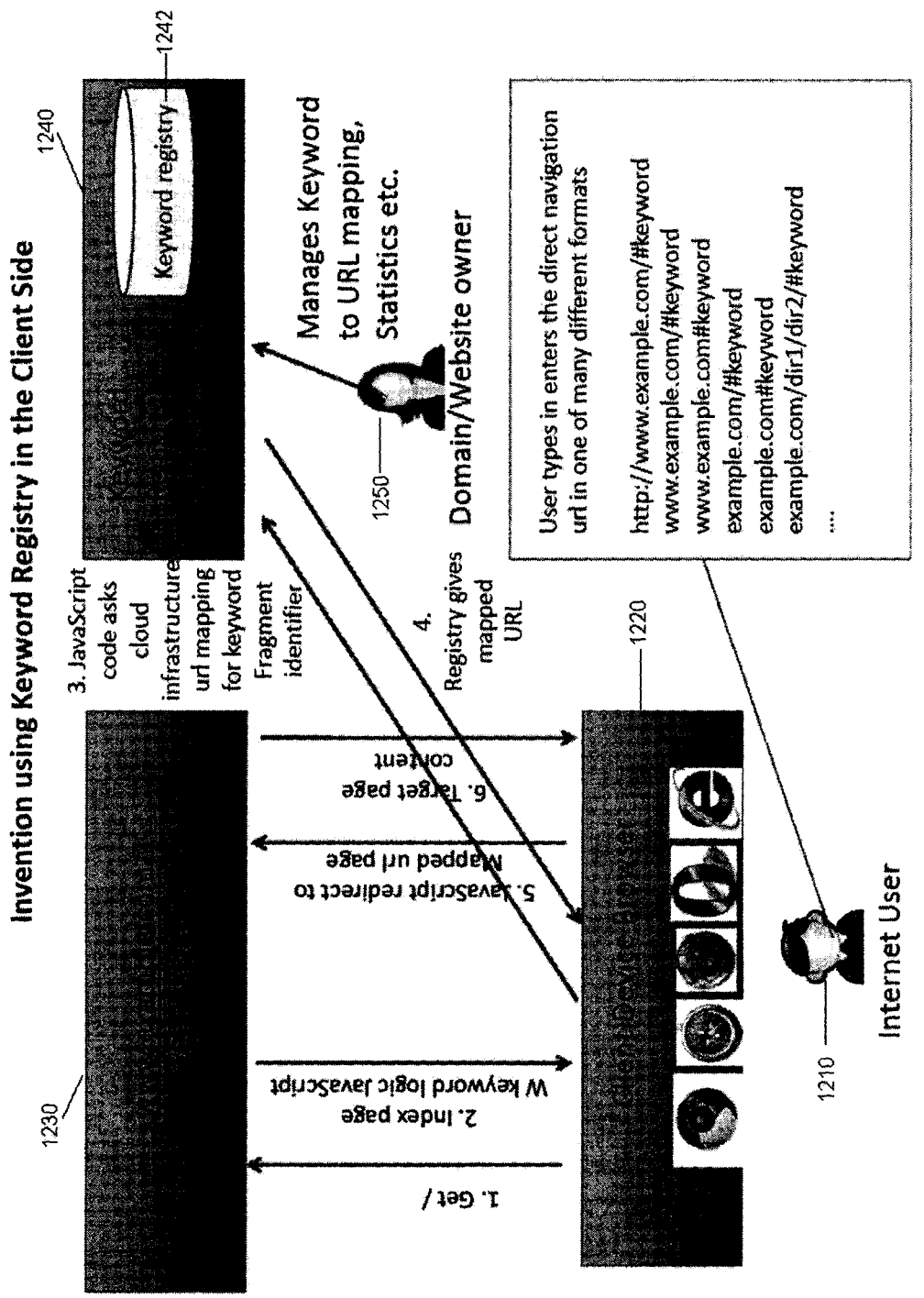
FIG. 12 is an exemplary implementation of keyword/URL mapping on the client side consistent with the present invention.

FIG. 12 is an exemplary implementation of keyword/URL mapping performed on the client side. As shown in FIG. 12, a user 1210 may input a direct navigation URL, such as "example.com#keyword," into browser 1220, causing the browser 1220 to make an HTTP GET request to the example.com server 1230. In response to the user specifying the direct navigation URL, the GET request from the browser 1220 may request the resource that corresponds to the root "/" directory from the server 1230 that hosts the domain name "example.com." Generally, web servers transmit a default HTML file, such as "index.html," in response to a request for the root directory, along with the requisite keyword/URL mapping and keyword resolution program, such as, for example, a JavaScript code. Browser 1220 may then implement the keyword resolution program to communicate with a cloud infrastructure 1240 that may includes a keyword registry 1242. The cloud infrastructure 1240 will determine the URL to keyword mapping and the mapped URL, and will transmit the mapped URL to browser 1220. The browser 1220 may then transmit a request to the server 1230 for the mapped URL page, and in response to the request, the server may return the target page.

Keyword/URL mapping may also be performed entirely on the client side. In some embodiments, a client may maintain a local file system or database for the resolution of URL keywords, rather than relying on either the content provider or a third-party resolution service provider to resolve keyword/URL mappings. For example, HTML 5 allows for client-executable code, such as JavaScript®, to access or query a local database in order to retrieve data or content. The client-executable program received from the content provider may rely on such a local database to look up the mapping between a keyword and URL, and, once the relevant URL is located, may direct the browser directly to the URL, thus cutting out at least one HTTP request from the client to a remote server from the process. In other embodiments, the client-executable code can itself generate the local file system or database for the resolution of URL keywords.

Figure 13:
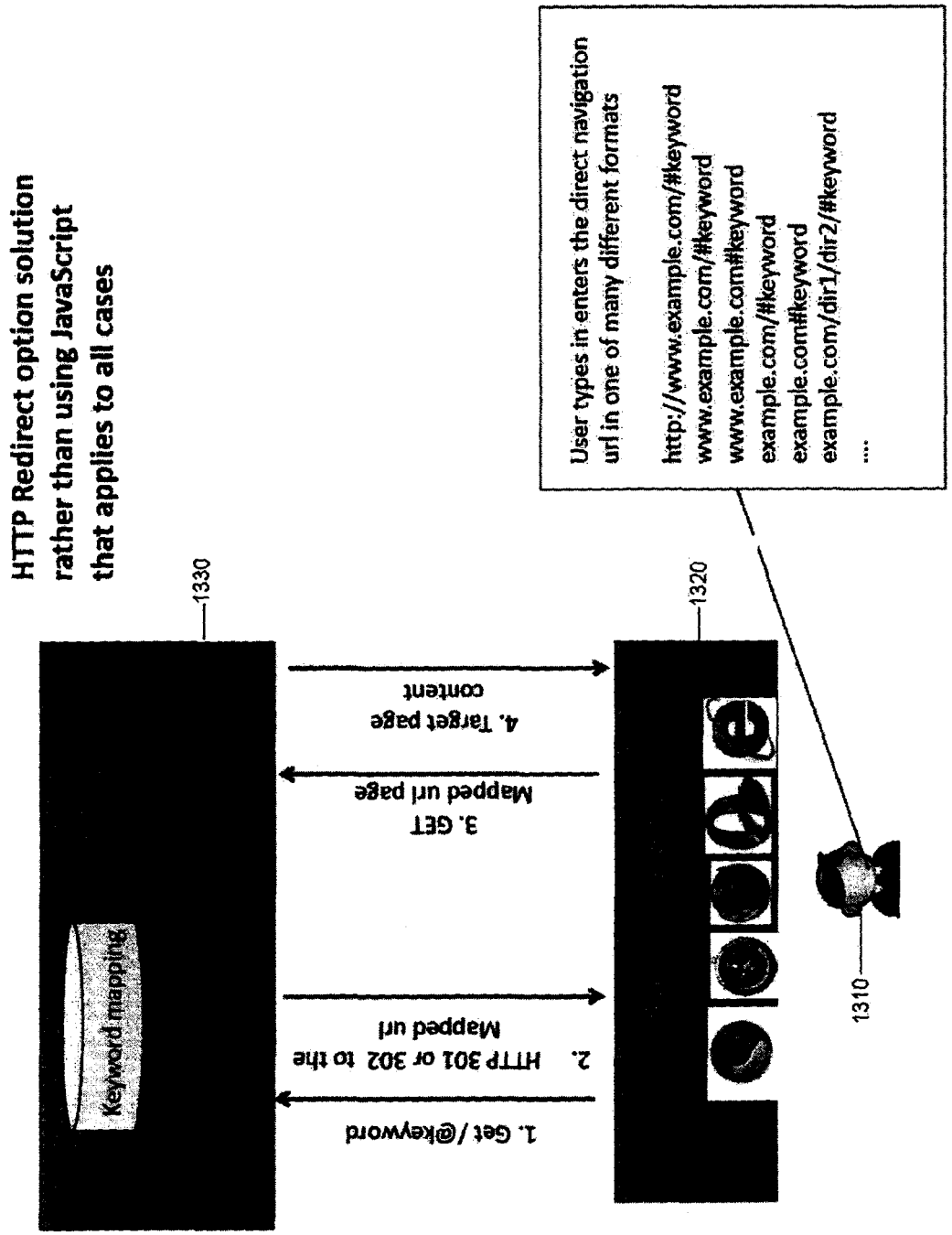
FIG. 13 is an exemplary implementation of keyword/URL mapping using HTTP redirect.

In another embodiment, URL keyword resolution operations may be performed entirely on the server side without relying on the client to execute any client-executable code. For example, as shown in FIG. 13, a user 1310 may input a direct navigation URL, such as "example.com#keyword," into browser 1320. If the URL keyword is delimited by a character other than a hash symbol (e.g., a "@" character), then, unlike the fragment identifier, the keyword may be transmitted to the content provider server 1330 as part of the client's 1320 initial HTTP request. The content provider server 1330, for example, may identify the keyword, determine the appropriate URL mapping for the keyword, and redirect the client 1320 (e.g., using an HTTP 301 Redirect instruction) to the appropriate URL for the keyword, all without relying on the client 1320 to execute any client-executable code. Alternatively, the content provider server could request resolution, or instruct the client to request resolution, of the keyword from a separate server, such as a keyword resolution server.

In another embodiment, if a client requests a keyword that has not been created or designated by a content provider, the client-executable program, keyword resolution server, or content provider server may provide for certain default options. For example, in response to a request for a non-existent keyword, the client may simply render the webpage identified by the base URL of the initial HTTP request. Alternatively, the client may be provided with a webpage, JavaScript alert, or other notification that the user has requested a non-existent keyword. The user may also be provided with a list of potentially similar existing keywords that the user may select in lieu of the non-existent, originally requested keyword. The user may also be provided with a traditional list of webpages generated using traditional keyword searching techniques. If theprompted with a list of potential matching keywords from which the user may select.

In yet another embodiment, if a user inputs the hash tag to request a keyword the content provider, a hash module may provide a list of all of the available keywords associated with a particular domain. For example, the hash module may be a browser add-on or plugin that determines in real-time whether or not a user has entered a hash tag into the address bar of a browser. If so, the auto completion module will communicate with one or more of the content provider, client-executable program, keyword resolution server, or content provider server to determine whether any keywords associated with that particular domain. The more alphanumeric characters entered by the user into the browser, the narrower the list of available keywords associated with the particular domain. If there are keywords associated with the domain, the hash module may generate a pop-up list including those key words. If there aren't keywords associated with the domain, the hash module may redirect the user to a search service page.

In another embodiment, a smart navigation module may be provided to inform a user if a particular domain has keyword smart navigation. For example, the smart navigation module may be a browser add-on or plugin that reviews, in real-time, a domain input into an address and determines whether or not that particular domain has associated keywords by communicating with one or more of the content provider, client-executable program, keyword resolution server, or content provider server. If so, the smart navigation module may provide an indication that the domain has associated keywords such as, for example, changing the color of the address bar or inserting a particular graphic into the browser or associated webpage.

The resolution service provider, in addition to providing a keyword management interface and/or keyword resolution service, may also provide content providers with access to rich metrics and statistics concerning keyword resolution requests from clients. For example, the interface 300 of FIG. 3 may also allow a user and/or content provider to view and/or download the number of times that each created keyword has been requested from clients. As another example, the resolution service provider could track how many times keywords have been used, who used the keywords, the type of keyword used, the websites visited, and various other information using, for example, cookies. Interface 300 may also provide information about the number of requests for various non-existent keywords by users, thus allowing the content provider to determine the need for creating additional keywords as a result of user demand. Such non-existent keyword information may also comprise information about misspellings of existent keywords to inform the content provider of the need to create additional keywords to account for misspellings or homophones of existing keywords or to improve upon permissible wildcard or regular expression matching functionality.

The resolution service provider may also provide malware-free secure navigation. Since the number of websites available on the internet is so large, it's practically impossible to scan all of them for malware. However, since the resolution service provider knows the URL associated with a particular keyword, the resolution service provider could scan the URL to determine whether its free of malware using, for example, the systems and methods for malware detection and scanning disclosed in U.S. patent application Ser. Nos. 12/982,508 and 12/982,540, the entire contents of which are incorporated herein by reference in their entireties. Accordingly, when a user enters a direct navigation URL such as "example.com#keyword" into a browser, the user has a high level guarantee that the URL is safe for browsing and doesn't include malicious content.

In another embodiment, one or more of the content provider, the client-executable program, keyword resolution server, or content provider server may automatically optimize a particular website based on an identification the client device such. For example, the client-executable program may identify the user's device (e.g., a mobile phone) to forward the user to the particular device's version of the website. The client executable program may automatically optimize the website using, for example, the method discussed in U.S. patent application Ser. No. 13/078,680 filed on Apr. 1, 2011 entitled "Systems, Apparatus, and Methods for Mobile Device Detection", which is hereby incorporated by reference in its entirety.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. As another example, while a user may type a URL into a browser, the URL can be provided by any number of means such as, for example, by speaking a URL and using voice recognition associated with the domain and/or the keyword to input the URL-related information.

The invention claimed is:

1. An apparatus for retrieving a webpage associated with a domain-specific keyword, comprising:
   a memory; and
   a processor communicatively coupled to the memory, the processor being configured to:
      receive an instruction from a client to request a first resource defined by a first URL, wherein the first URL includes a keyword in the form of a fragment identifier, wherein the keyword is specified by the client;
      send a first HTTP request to a first web server associated with a domain specified by the first URL;
      receive a first HTTP response from the first web server, wherein the first HTTP response includes a client-executable program; and
      execute the client-executable program upon receipt to, without user input:
         determine, without user input, a second URL associated with the first URL by the client-executable program retrieving the second URL from a keyword registry database based on matching the keyword and the domain to the second URL, the keyword registry database comprising data mapping the keyword and the domain to the second URL, the second URL being associated with a target page; and
         provide, without user input, the second URL to the client.

2. The apparatus of claim 1, the processor being further configured to:
   send a second HTTP request to a second web server for a second resource defined by the second URL; and
   receive a second HTTP response from the first web server, wherein the second
      HTTP response includes the target page.

3. The apparatus of claim 1, wherein the client maintains the keyword registry database.

4. The apparatus of claim 1, wherein a source external to the client maintains the keyword registry database.

5. The apparatus of claim 4, wherein the source external to the client comprises a cloud-based service.

6. The apparatus of claim 1, wherein determining a second URL associated with the first URL comprises:
   determining whether a domain associated with the first URL and the keyword is included in a keyword registry database, the keyword registry database including data mapping database keywords to database URLs;
   if the one or more domains and the keyword are included in the keyword registry database, matching the keyword to one of the database keywords and selecting the second URL from the database URLs based on the match; and
   if the one or more domains and the keyword are not included in the keyword registry database, selecting the second URL based on a default option.

7. The apparatus of claim 6, further comprising a second client-executable program, the second client-executable program:
   receiving interface data comprising received keywords and associated received URLs; and
   modifying the keyword registry database based on the received interface data.

8. The apparatus of claim 6, wherein the second URL is selected based on a location of the client.

9. The apparatus of claim 6, wherein the second URL is selected based on device metadata associated with the client.

* * * * *